(12) United States Patent
O'Hearn

(10) Patent No.: US 7,837,412 B2
(45) Date of Patent: Nov. 23, 2010

(54) BINDER FOR MINE TAILINGS, ALLUVIAL SAND AND THE LIKE

(75) Inventor: Brian O'Hearn, Richmond Hill (CA)

(73) Assignee: LaFarge Canada Inc., Montreal, Quebec (CA)

( * ) Notice: Subject to any disclaimer, the term of this patent is extended or adjusted under 35 U.S.C. 154(b) by 785 days.

(21) Appl. No.: 11/705,208

(22) Filed: Feb. 12, 2007

(65) Prior Publication Data

US 2007/0186820 A1 Aug. 16, 2007

Related U.S. Application Data

(60) Provisional application No. 60/773,353, filed on Feb. 15, 2006.

(51) Int. Cl.
 *C09K 8/46* (2006.01)
(52) U.S. Cl. .................... 405/266; 405/267; 166/285; 166/292
(58) Field of Classification Search ............... 405/266, 405/267; 166/285, 292; 106/713, 716, 789
See application file for complete search history.

(56) References Cited

U.S. PATENT DOCUMENTS

| | | | |
|---|---|---|---|
| 4,451,295 A | 5/1984 | Sprouse | |
| 5,340,235 A | 8/1994 | Milliken | |
| 5,551,806 A * | 9/1996 | Milliken | 405/266 |
| 6,402,833 B1 * | 6/2002 | O'Hearn et al. | 106/790 |
| 7,537,655 B2 * | 5/2009 | Abbate | 106/713 |
| 7,631,692 B2 * | 12/2009 | Roddy et al. | 166/250.14 |
| 2008/0017077 A1 * | 1/2008 | Abbate | 106/679 |

FOREIGN PATENT DOCUMENTS

| | | |
|---|---|---|
| CA | 963482 | 2/1975 |
| CA | 1056409 | 6/1979 |
| CA | 1323185 | 10/1993 |
| CA | 2107006 | 3/1995 |
| CA | 2214142 | 9/1996 |

* cited by examiner

*Primary Examiner*—Paul Marcantoni
(74) *Attorney, Agent, or Firm*—Bachman & LaPointe, P.C.

(57) ABSTRACT

A binder for mine tailings, alluvial sand and other aggregate used as a backfill for an underground void comprises ferrous slag, cement kiln dust and/or lime kiln dust, and Portland cement and/or lime; the binder displays strength characteristics better than or comparable to those achieved with conventional binders based on Portland cement or Portland cement and slag.

13 Claims, No Drawings

BINDER FOR MINE TAILINGS, ALLUVIAL SAND AND THE LIKE

CROSS-REFERENCE TO RELATED APPLICATION(S)

This application claims the benefit of provisional patent application No. 60/773,353 filed Feb. 15, 2006, entitled BINDER FOR MINE TAILINGS, ALLUVIAL SAND AND THE LIKE.

BACKGROUND OF THE INVENTION (1) Field of the Invention

This invention relates to a fill material for an underground void; and to a method of backfilling an underground void.

(2) Description of Prior Art

In mining, backfill is often necessary as part of a particular mining method for ground stability or as a platform to work from. In general, the milling of ore produces a waste stream of finely ground rock particles, ranging in size from 425 microns to 10 microns and finer, often referred to as tailings. These tailings may be employed as the principal component of backfill.

Natural sand rock material ranging from less than 15 cm to 0.23 cm and some other type of aggregate as well as combinations of any of these materials, referred to as aggregates may also be employed as the principal component of backfill.

Alluvial sand is also employed as backfill, especially in cases where mine tailings are not readily available.

Thus, backfill generally comprises mill or mine tailings, a waste product from mine beneficiation, natural sand, rock material or some other type of aggregate or some combination of any of these materials, referred to as aggregates.

Not all backfill must be free standing, but when consolidation is required, the aggregates are mixed with a slurry comprising a binder and water. When consolidation is required, the aggregates are mixed with this slurry of binder and water. Common binders can consist of a combination of one or more of the following, a variety of Portland cement, iron blast slag, fly ash and lime. On some occasions flocculants, water reducers, accelerators, gelling agents, such as sodium silicate, or other specialty products are added to the backfill to: enhance flow, retard set-up of the binder, minimize the loss of fine particles, accelerate early strength and absorb water.

For hydraulically placed material and paste backfill, boreholes and pipes are used to transport the backfill to its final destination. For rock backfill, generally trucks or conveyor belts are used to deliver the fill to its planed site of application.

In order for a binder to be effective in any backfill application, the high early strength (3-5 days) and or long term strength (28 days) must satisfy a strength criteria highly dependent on the widths and heights of walls left unsupported after mining of a particular section (stope) is complete. Other important criteria that affect backfill strength include: backfill aggregate size distribution, binder concentration levels and the water content of the backfill.

The mine tailings and other aggregates are essentially inert to reaction with the binder and the water, although sulphates, magnesium and other metal oxides and compounds found in mine tailings may occur in quantities that affect the effectiveness of the binder. In practice the binder sets in the presence of the water to form a solid mass which binds the aggregate of the backfill.

In practice the fill material which is comprised of aggregate, binder and water is formed into an aqueous mobile slurry or paste which is gravity fed or pumped through pipes or otherwise introduced into the void. In place in the void the binder and water react, solidifying into a mass which binds the backfill. This solidification process may extend over several weeks.

The solidified material provides support in the void (stope), for example, to maintain the integrity of adjacent tunnels employed to provide access to new mining areas. Typically the voids are underground sites from which metal ore has been mined and the mine tailings component of the backfill introduced into the void may be derived from the metal ore previously removed from the mining site which resulted in formation of the void.

The use of the backfill in this manner also provides a ready means of disposing of the waste mine tailings while maintaining the structural integrity of the mine substructure.

Portland cement is usually a significant component of binders commercially employed for backfill which includes mine tailings as described here. However, it would be advantageous to mining companies to utilize binders that outperform Portland cement, and that employ only low amounts of Portland cement or no Portland cement.

U.S. Pat. No. 6,402,833 describes a fill material for an underground void which employs a binder based on ferrous slag and cement kiln dust, and optionally lime kiln dust. This binder was found to outperform Portland cement as a binder for backfill, in many conditions.

SUMMARY OF THE INVENTION

It is an object of this invention to provide a binder composition for a backfill which can outperform Portland cement in many conditions.

It is a further object of this invention to provide such a binder composition based primarily on a what were previously considered waste by-products from industrial manufacturing rather than on mainstream manufactured products.

It is a still further object of this invention to provide such a binder composition containing a relatively low content of Portland cement.

It is also the object of this invention to provide a binder composition that can outperform that described in U.S. Pat. No. 6,402,833 in early strength as well as early and 28 day strengths for backfill consisting of alluvial sand.

It is a further object of this invention to provide a method of backfilling an underground void.

It is yet another object of this invention to provide a particulate binder composition for a backfill material.

In accordance with one aspect of the invention, there is provided a fill material for an underground void comprising an intimate mixture of: a particulate composition comprising aggregate particles, a particulate, hydraulically solidifiable inorganic binder composition for said particulate composition and water, said binder composition comprising, in weight %, to a total of 100%, based on the weight of the binder composition: a) 49 to 95% of a ferrous slag; b) 2.5 to 35% of kiln dust selected from cement kiln dust, lime kiln dust and mixtures thereof, wherein said cement kiln dust has a free lime content of at least 2.5%, by weight, based on the weight of cement kiln dust; and c) 2.5 to 16% of a material selected from Portland cement, lime and combinations thereof.

In another aspect of the invention, there is provided a method of backfilling an underground void comprising: filling said void with a fill material of the invention, and hydraulically solidifying said binder composition and said water to form a solid mass binding said particulate composition.

In yet another aspect of the invention, there is provided a particulate binder composition for a backfill material comprising, in weight %, to a total of 100%, based on the weight of the binder composition: a) 49 to 95% of a ferrous slag; b) 2.5 to 35% of kiln dust selected from cement kiln dust, lime kiln dust and mixtures thereof, wherein said cement kiln dust has a free lime content of at least 2.5%, by weight, based on the weight of cement kiln dust; and c) 2.5 to 16% of a material selected from Portland cement, lime and combinations thereof.

DESCRIPTION OF PREFERRED EMBODIMENTS OF THE INVENTION

Fill Material

The fill material of the invention comprises an intimate mixture of a particulate composition comprising aggregate particles, a particulate hydraulically solidifiable inorganic binder composition for the particulate composition and water.

The aggregate particles of the particulate composition may be mill or mine tailings, or sand, or rock particles (rock fill), or may include combinations of these. Preferred aggregate particles for the backfill are mine tailings. Alluvial sand also represents a preferred class of aggregate particles for the backfill Suitably the fill material has a solids content or pulp density i.e. (total solids/[total solids+liquids]) of 65 to 85%, by weight; and the weight ratio of the binder composition to the particulate composition is 1:8 to 1:50, for example 1:8 to 1:40, preferably 1:10 to 1:35, more preferably 1:15 to 1:30.

The most common proportions of binder to particulate compositions are 1:15 and 1:30. The most common pulp densities are either about 70% or about 80%. Where rock fill is the backfill material a slurry of water and binder, generally 50% binder and 50% water, is mixed and delivered to the rock fill where it is poured on the rock so as to coat it, then it is mixed and delivered to its final destination.

The fill material of the invention achieves good strength results in 5 days and demonstrates good strength results after 7 days and 28 days. In particular binder compositions of the invention comprising a low amount of Portland cement, iron blast furnace slag and cement kiln dust provided better strength results at 5 days, 7 days and 28 days than corresponding binder compositions comprising only Portland cement and binder compositions comprising only Portland cement and iron blast furnace slag.

Fill material of the invention containing lime kiln dust in the binder composition, with a low amount of Portland cement and iron blast furnace slag achieved 5 day, 7 day and 28 day strengths comparable with those for the corresponding fill materials in which the binder composition contained a low amount of Portland cement, cement kiln dust and iron blast furnace slag. Low amounts of lime can be employed in place of the low amount of Portland cement. It is also possible to employ both Portland cement and lime.

Fill material of the invention was found to be particularly advantageous in binding backfill comprised of a coarse sand typical of alluvial sand sources, which typically has a wide grain size distribution. The new binder also shows greater early strength (3-5 days) than the binder in U.S. Pat. No. 6,402,833.

Alluvial sand typically has a size such that 8% passes a 140 Sieve (US Series) or 150 Tyler Mesh. In comparison, about 40% of mine tailings pass through such screens. These screens have sieve or mesh openings of about 106 microns.

The components of the binder composition may be blended together prior to use or may be mixed at the site of formation of the fill material.

Thus, the addition of Portland cement or lime, or both, to a blend of cement kiln dust (CKD) or lime kiln dust (LKD), or both, with slag improves or matches the overall backfill strength compared to a blend of slag and Portland cement, for example, 90% slag and 10% Portland cement. The Portland cement addition to this blend improves the consistency of performance of the binder composition.

CKD and LKD are known to vary in composition from plant to plant, largely due to the technology utilized to manufacture the Portland cement or lime. Moreover, from plant to plant the chemistry of the raw source materials and fuels may be different and even within a plant, raw materials and fuels may change from one source to another, from time to time, causing changes in the chemistry of the raw materials and fuel mixture. Since the CKD and LKD are byproducts of the raw materials and fuel, their composition fluctuates in proportion to these ingredient variations.

The addition of Portland cement to a blend of CKD or LKD plus slag produces a competitive binder that accommodates CKD and LKD byproducts into a commercial application, namely backfill. Consequently, both Portland cement and iron blast furnace slag products are extended in their use.

Backfill

The particulate composition generally referred to as backfill may be composed completely of mill or mine tailings or it may be composed of mill or mine tailings and inert aggregate, for example, fine aggregate and coarse aggregate.

The nature of mill or mine tailings depends on the mine from which the ore is derived and in general they are composed of different residual minerals separated from metal ore, in processing stages directed at beneficiation of the metal ore prior to the smelting or other metal recovery operation.

By way of example, only mill or mine tailings may typically comprise varying amounts of quartz, phlogopite, albite, tremolite, phyrrhotite, kaolinite and magnetite.

Mill or mine tailings may typically have a median particulate size of 20 to 150 microns, and may include finely ground rock particles ranging in size from 10 microns to 425 microns.

The nature of the mill or mine tailings is in no way critical to the invention.

The backfill may also be composed of sand and especially alluvial sand.

The aggregates which may be included in the backfill may typically include the same classes of fine aggregate and coarse aggregate routinely employed in concrete.

A typical fine aggregate is sand and other material of mineral composition having a particle size of 150 µm to 4.75 mm.

Coarse aggregate typically comprises rock of varying size, gravel, crushed stone and other material of mineral composition having a particle size of 2.3 mm to 15 cm, generally at least 4.75 mm and typically 1.5 cm to 4 cm.

Binder Composition

The binder composition of the invention comprises ferrous slag, cement kiln dust or lime kiln dust, and Portland cement or lime.

Typically, the ferrous slag is the major component of the binder composition and the Portland cement or lime, or combinations thereof, is a minor component. The slag and the cement kiln dust or lime kiln dust all are secondary products formed in the manufacture of other products, for example, iron, in the case of iron blast furnace slag; cement in the case of cement kiln dust; and lime in the case of lime kiln dust.

The ferrous slag component is preferably iron blast furnace slag and is employed in an amount of 49 to 95%, preferably 60 to 90%, by weight, of the binder composition; the cement kiln dust or lime kiln dust, or a mixture thereof is employed in an amount of 2.5 to 35%, preferably 10 to 30%, by weight of the composition. The Portland cement or lime, or combinations thereof, is employed in an amount of at least 2.5%, by weight, generally 2.5 to 16%, preferably less than 10%, and in particular 2.5 to 5% by weight, of the binder composition. The indicated percentages, by weight, are to a total of 100% of the binder composition.

Iron Blast Furnace Slag

The preferred iron blast furnace slag is a residue by-product in the production of iron from iron ore in a blast furnace. The molten slag is typically water-cooled and pelletized or granulated; thereafter it is ground, for example, in a ball mill, and sized to a fineness typically of 4,500 to 5,000 Blaine.

During the process of melting iron ore in a blast furnace, the non-metallic components form the slag which floats on the molten metal, is separated and sent by runners to a granulator where the slag is rapidly quenched with water. The iron blast furnace slag forms a glassy, white, sand-like material which, when ground to cement-like fineness, has cementitious and pozzolanic properties.

Cement Kiln Dust and Lime Kiln Dust

Cement kiln dust and lime kiln dust are produced in kilns as by-products in the manufacture of cement and lime, respectively. These products are mineral particulates collected in bag houses from the flue gases produced during the sintering process.

They are composed of fine particles typically having a particle size of 100% passing 300 microns and 50% passing 20 microns for cement kiln dust and 100% passing 1,000 microns and 50% passing 100 microns for lime kiln dust.

The cement kiln dust preferably has a total alkali content of at least 1.5%, by weight, to provide satisfactory early strength in the binder composition. If the total alkali content is less than 1.5%, by weight, it can be supplemented by alkali from other sources, for example, waste sludge containing a sufficient and available alkali content. Such a supplementary source of alkali should be effective to provide a total alkali content in the composition, equivalent to a total alkali content of at least 1.5%, by weight, in the cement kiln dust.

Substances classified as alkalis are used commercially as activators (accelerators) of the pozzolanic reaction. Cement kiln dust, a product readily available at many cement plants, is generally a higher source of alkalis than Portland cement. The composition of the CKD is largely governed by the chemistry of the raw materials and fuels utilized in order to manufacture cement clinker. However, not all CKD may contain sufficient amounts of alkali to significantly activate the early strength of slag, which also contains variable amounts of alkali. For example, from the kiln of one plant, the total alkali content of the cement kiln dust was 2.54% by mass and found to be an effective activator. However, from another plant, the total alkali content of 0.05% in the cement kiln dust was found to be less satisfactory as an activator. The alkali content of a cement kiln dust insufficient in alkali can be enhanced with alkali from other sources to become effective.

The free lime CaO content of the CKD needs to be at least about 2.5% in order for the CKD to be effective in achieving high early strength.

Portland Cement and Lime

Although normal Portland cement (NPC), known as GU or type 1, is preferred, other types of Portland cement may be used with slightly greater or reduced strength development. The lime may be a crushed quicklime product, readily available from most lime producers.

Table 1 below, sets out typical chemical compositions of the iron blast furnace slag, cement kiln dust and lime kiln dust components of the binder composition of the invention.

TABLE I

| | Chemistry +/− Range | | | | | |
|---|---|---|---|---|---|---|
| Material | $SiO_2$ | $Al_2O_3$ | $Fe_2O_3$ | CaO | $SO_3$ | MgO |
| IBFS[1] | 35.8 +/− 1.9 | 9.3 +/− 1.9 | 0.69 +/− .38 | 37.4 +/− 5.0 | 3.4 +/− 1.1 | 11.35 +/− 5.3 |
| CKD[2] | 13.4 +/− 1.8 | 3.82 +/− 1.4 | 1.64 +/− 0.14 | 48.4 +/− 5.6 | 16.0 +/− 4.2 | 1.26 +/− 0.30 |
| LKD[3] | 8.24 +/− 3.6 | 4.49 +/− 1.8 | 0.84 +/− 0.30 | 55.2 +/− 7.8 | 4.6 +/− 1.9 | 1.63 +/− 0.50 |
| | | Material | $Na_2O$ | $K_2O$ | $TiO_2$ | LOI[4] |
| | | IBFS[1] | 0.43 +/− 0.18 | 0.44 +/− 0.10 | 0.69 +/− .38 | |
| | | CKD[2] | 0.33 +/− 0.18 | 4.50 +/− 2.2 | 0.25 +/− 0.06 | 10.3 +/− 3.8 |
| | | LKD[3] | 0.21 +/− 0.10 | 1.33 +/− 0.88 | 0.22 +/− 0.10 | 22.4 +/− 3.3 |

IBFS[1] = Iron Blast Furnace Slag
CKD[2] = Cement Kiln Dust
LKD[3] = Lime Kiln Dust
LOI[4] = Loss on Ignition Water The water hydraulically reacts with the particulate binder composition to form a mass which slowly solidifies forming a hard mass in which the particulate backfill is bound.

The water is typically employed in the fill material to provide a solids content in the fill material of 65 to 85%, preferably 70 to 80%, and typically about 70% or about 80%, by weight.

EXAMPLES

The following Table of Examples demonstrates the strength results achieved with fill material of the invention as compared with comparison fill materials, including fill materials in which the binder is based on Portland cement alone, and fill materials in which the binder is based on Portland cement and slag but no cement kiln dust or lime kiln.

A solids consistency or pulp density of 68%, by weight, was employed throughout.

Examples 3, 4, 5, 6, 7, 8 and 11 to 15 illustrate the invention employing a binder composition containing Portland cement, cement kiln dust and slag. Examples 16, 17 and 19 illustrate the invention employing a binder composition containing Portland cement, lime kiln dust and slag. Example 18 illustrates the invention employing a binder composition containing lime, cement kiln dust, and slag. The remaining Examples are for comparison. Thus, Examples 3 and 4 of the invention compared with the conventional fill material of Example 1 show the improved results over the prior art. Comparison of Examples 3 and 4 of the invention compared with fill material of the invention but excluding cement kiln dust or lime kiln dust, i.e., Example 2, shows the benefit of the combination of the invention.

In the Examples, the following notations are employed:
CKD=cement kiln dust
LKD=lime kiln dust
NPC=normal Portland cement
Slag=iron blast furnace slag
Tailings=mill or mine tailings
Portland=Portland cement
PD=pulp density The Tailings: Binder column identifies the weight ratio of tailings to binder composition.

TABLE OF EXAMPLES

| Materials (68% P.D.) | Portland or Lime:LKD or CKD:Slag | Tailings:Binder | Strength Results [(p.s.i.)] | | |
|---|---|---|---|---|---|
| | | | Break 1 (3 Days) | Break 2 (7 Days) | Break 3 (28 Days) |
| NPC + Tailings | 100% Portland | 30:1 | — | — | 14.9 |
| NPC + Slag + Tailings | 10:0:90 | 30:1 | — | — | 48.9 |
| NPC + CKD: + Slag + Tailings | 5:10:85 | 30:1 | 16.3 | 20 | 51.5 |
| NPC + CKD: + Slag + Tailings | 5:15:80 | 30:1 | 18.3 | 22.2 | 46.1 |
| NPC + CKD: + Slag + Alluvial Sand | 5:25:70 | 30:1 | — | 102.4 | 180.5 |
| NPC + CKD: + Slag + Alluvial Sand | 5:30:65 | 30:1 | — | 96.2 | 174.4 |
| NPC + CKD: + Slag + Alluvial Sand | 5:45:50 | 30:1 | — | 75.9 | 152.2 |
| NPC + CKD + Slag + Alluvial/Tailings Blend | 5:25:70 | 30:1 | — | 23.2 | 45.7 |
| NPC + CKD + Slag + Alluvial/Tailings Blend | 0:10:90 | 30:1 | — | 0.0 | 49.5 |
| NPC + Slag + Tailings | 10:0:90 | 15:1 | 37.0 | 45.0 | 86.3 |
| NPC + CKD: + Slag + Tailings | 5:10:85 | 15:1 | 39.0 | 45.7 | 81.3 |
| NPC + CKD: + Slag + Tailings | 5:15:80 | 15:1 | 40.5 | 50.7 | 92.9 |
| NPC + CKD: + Slag + Tailings | 5:20:75 | 15:1 | 34.9 | 44.4 | 84.5 |
| NPC + CKD: + Slag + Tailings | 5:25:70 | 15:1 | 36.2 | 47.3 | 95.4 |
| NPC + CKD: + Slag + Tailings | 5:30:65 | 15:1 | 34.7 | 51.6 | 103.6 |
| NPC + LKD + Slag + Tailings | 5:15:80 | 15:1 | 32.7 | 43.7 | 83.1 |
| NPC + LKD + Slag + Tailings | 10:15:75 | 15:1 | 30.0 | 44.9 | 89.3 |
| Lime + CKD + Slag + Tailings | 10:15:75 | 15:1 | 21.6 | 31.8 | 76.8 |
| NPC + LKD + Slag + Tailings | 10:15:75 | 15:1 | 39.4 | 53.2 | 102.9 |

It will be understood that various modifications can be made in the composition of the invention as described, while employing the spirit of the invention, and such modifications are to be considered as being within the scope of the invention.

The invention claimed is:

1. A method of backfilling an underground void comprising:
filling said void with a fill material comprising an intimate mixture of:
a particulate composition comprising aggregate particles, a particulate, hydraulically solidifiable inorganic binder composition for said particulate composition and water, said aggregate particles comprising mine tailings, alluvial sand, rock fill, or combinations thereof;
said binder composition comprising, in weight %, to a total of 100%, based on the weight of the binder composition:
a) 49 to 95% of a ferrous slag;
b) 2.5 to 35% of kiln dust selected from cement kiln dust, lime kiln dust and mixtures thereof, wherein said cement kiln dust has a free lime content of at least 2.5%, by weight, based on the weight of cement kiln dust; and
c) 2.5 to 16% of a material selected from Portland cement, lime and combinations thereof, and
hydraulically solidifying said binder composition and said water to form a solid mass binding said particulate composition.

2. A method according to claim 1, wherein c) is Portland cement in an amount of 2.5 to 16%.

3. A method according to claim 1, wherein b) is cement kiln dust, and said cement kiln dust has a total alkali content of a least 1.5%, by weight, based on the weight of cement kiln dust.

4. A method according to claim 1, wherein b) is cement kiln dust and further including a supplementary source of alkali effective to provide a total alkali content in said binder composition equivalent to a total alkali content of a least 1.5%, by weight, based on the weight of cement kiln dust.

5. A method according to claim 1, wherein b) is lime kiln dust.

6. A method according to claim 1, wherein said aggregate particles comprise mine tailings.

7. A method according to claim 1, wherein said aggregate particles comprise alluvial sand.

8. A method according to claim 1, wherein said mixture further comprises inert particulate aggregate.

9. A method according to claim 1, having a solids content of 65 to 85%, by weight.

10. A method according to claim 1, wherein a) is iron blast furnace slag.

11. A method according to claim 1, comprising said binder composition and said particulate composition in a weight ratio of 1:8 to 1:40 and a solids content of 60% to 80%.

12. A method according to claim 8, comprising said binder composition, mine tailings and said aggregate in a weight ratio of binder composition to mine tailings and aggregate of 1:8 to 1:50.

13. A method according to claim 12, wherein c) is Portland cement in an amount of 2.5 to 16%.

* * * * *